United States Patent [19]

Bremer

[11] Patent Number: 5,142,549
[45] Date of Patent: Aug. 25, 1992

[54] REMELTING APPARATUS AND METHOD FOR RECOGNITION AND RECOVERY OF NOBLE METALS AND RARE EARTHS

[76] Inventor: Siegfried M. K. Bremer, 7340 E. Sweetwater Ave., Scottsdale, Ariz. 85260

[21] Appl. No.: 402,475

[22] Filed: Sep. 5, 1989

[51] Int. Cl.⁵ .......................................... H01J 37/305
[52] U.S. Cl. ........................................ 373/10; 373/11; 373/13; 373/15; 373/16; 373/56; 373/21; 219/121.28
[58] Field of Search .............. 373/11, 13, 10, 15, 373/16, 18, 2, 56, 65, 112, 21, 25; 219/121.28, 121.16, 121.17; 75/10.28, 10.62, 10.48, 504; 204/107, 140, 146; 423/27, 32, 34

[56] References Cited

U.S. PATENT DOCUMENTS

| | | | |
|---|---|---|---|
| 994,889 | 6/1911 | Thierry | 373/56 |
| 1,590,521 | 6/1926 | Juretzka | 373/56 |
| 3,219,435 | 11/1965 | Gruber et al. | 373/13 |
| 3,264,095 | 8/1966 | Ackermann | 373/65 |
| 3,342,250 | 9/1967 | Treppschuh et al. | 373/16 |
| 4,045,006 | 8/1977 | Cherednichenko et al. | 373/112 |
| 4,265,644 | 5/1981 | Gammon | 373/56 |
| 4,730,336 | 3/1988 | Herneisen et al. | 373/2 |

Primary Examiner—Bruce A. Reynolds
Assistant Examiner—Tu Hoang

[57] ABSTRACT

Apparatus for recognition of metals in base materials includes an electron beam furnace in which base materials are vaporized by means of an electron beam gun and the vaporized materials are condensed as free atoms or are alloyed with other components of the base materials, and are able to be recovered by conventional recovery techniques once they are recognized. The base material includes the products of smelting processes, pellets of compacted raw material like anode-mud or waste material, and the base materials are remelted utilizing the heat from electron beam guns for the remelting.

9 Claims, 3 Drawing Sheets

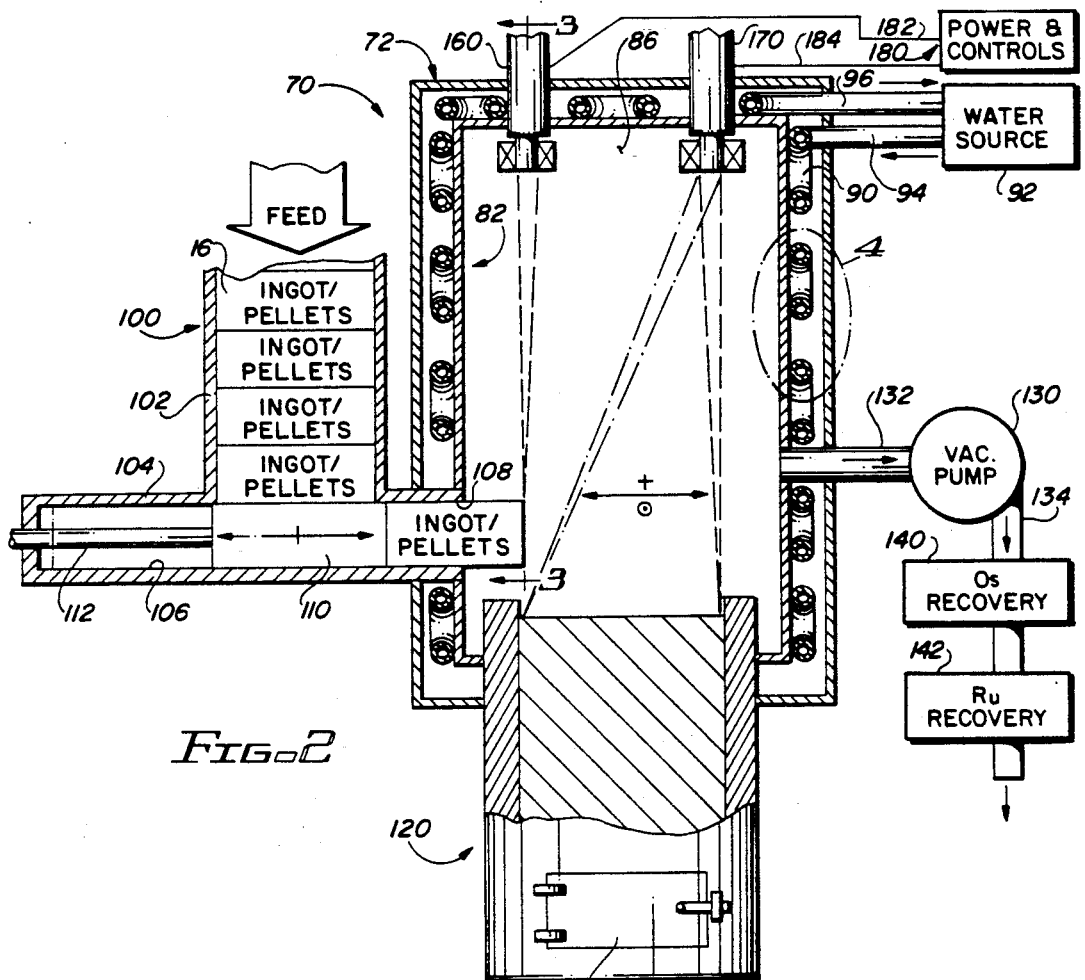
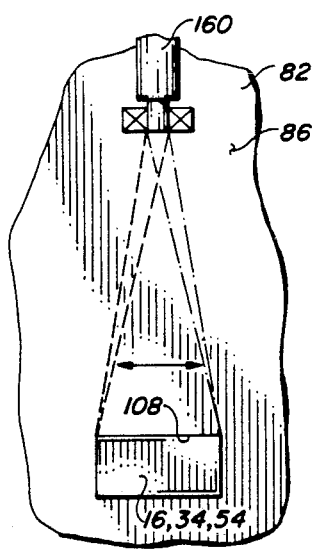
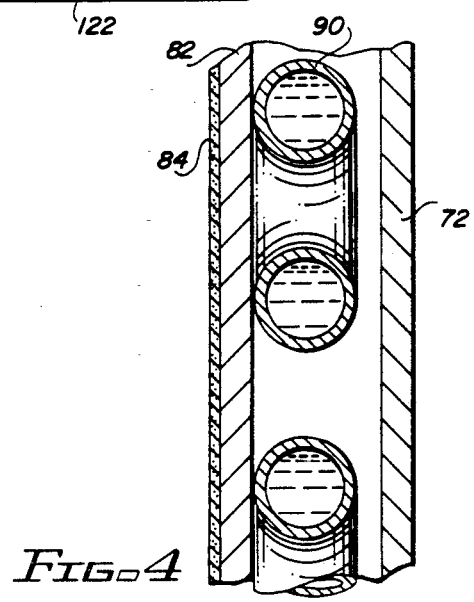

REMELTING APPARATUS AND METHOD FOR RECOGNITION AND RECOVERY OF NOBLE METALS AND RARE EARTHS

BACKGROUND OF THE INVENTION

1. Field of the Invention

This invention relates to the recognition and recovery of noble metals and, more particularly, to the remelting of materials in which certain metals, such as noble metals and rare earths are not recognized so as to allow the metals to be recognized and to be recovered.

2. Description of the Prior Art

Prior to the development of the apparatus and method herein disclosed, there has been no satisfactory way, either in terms of apparatus or method, of recovering metals in substantial quantities from certain types of ores, ore concentrates, anode mud, slag, and the like. The primary reason for this has been that the noble metals cannot be recognized.

It has been determined that noble metals may be unrecognizable in certain clusters. The clusters may be in primary ores or in the product of smelting processes or other processes from which certain types of metals are typically recovered, such as the processing of copper ores, iron ores, and the like.

While the chemical composition of the clusters is neither fully understood nor known, it is now recognized, primarily through the efforts and by means of the apparatus and method herein disclosed, that the unrecognizable metals, especially noble metals and rare earths, in the clusters may be freed from the clusters and may thus be either presented in the form of free atoms of the metals or may be alloyed with other metals. In both situations, the metals may be recognized and accordingly may be recovered through conventional recovery techniques.

SUMMARY OF THE INVENTION

The invention described and claimed herein comprises apparatus and method for recognizing certain metals, such as noble metals and rare earths, to enable the metals to be recovered by conventional recovery techniques. Base materials are vaporized in an electron beam furnace and the metals freed from the base materials are collected either as free atoms on condenser plates or, in the case of some of the metals, the metals are alloyed with various metals in the base material. The metals are freed from the clusters in which they are unrecognizable through the vaporization procedure and they may then be recovered by conventional metal recovery techniques which are well known and understood in the art.

Among the objects of the present invention are the following:

To provide new and useful apparatus for vaporizing base materials for the recovery of noble metals therein;

To provide a new and useful method for the recovery of metals from base materials;

To provide new and useful method steps from the recognition of metals from base materials;

To provide new and useful apparatus and method for the recognition of metals in a base material; and To provide new and useful method and apparatus for the recognition of metals from clusters of materials in which they are unrecognizable.

BRIEF DESCRIPTION OF THE DRAWING

FIG. 2 is a view in partial section of apparatus of the present invention.

FIG. 3 is a view in partial section taken generally along line 3—3 of FIG. 2.

FIG. 4 is an enlarged view in partial section taken generally from oval 4 of FIG. 2.

DESCRIPTION OF THE PREFERRED EMBODIMENT

Figure 1:
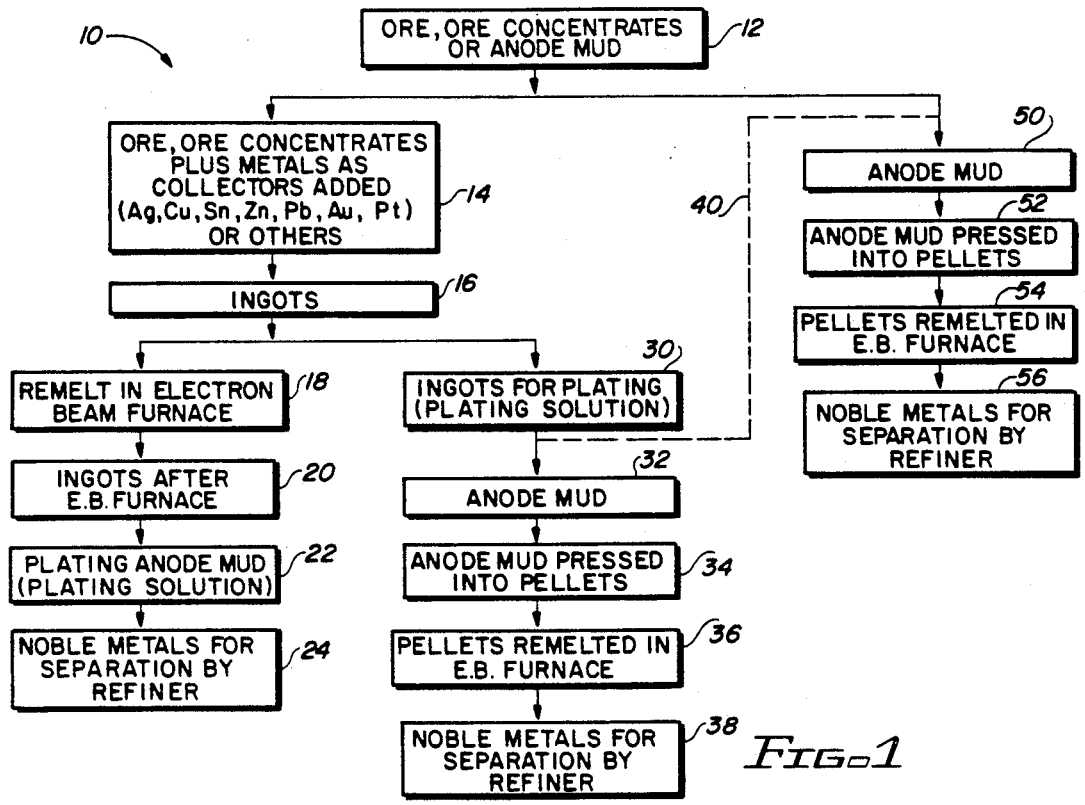
FIG. 1 is a block diagram of the method comprising the present invention.

FIG. 1 is a block diagram 10 illustrating the steps included in the method of the present invention. The block diagram 10 includes a plurality of blocks indicating the various steps taken, and generally three different methods are indicated. All of the three methods include a first common step, namely a step 12, which comprises the gathering of the starting materials. In the present invention, there are generally three types of starting materials. may be crushed rock, or the like. The ore concentrates may be the materials resulting from a smelting operation or the like. The anode mud is a material resulting from a plating operation in which the mud is the material that falls to the bottom of a plating tank and is not transferred or plated onto the cathode in the plating process. This will be discussed in more detail below in conjunction with FIG. 6.

Two methods include common first steps for the ore or ore concentrates. This is indicated by a block 14. As is indicated in the block 14, ore or ore concentrates take a different path than does the anode mud starting material. In the case of any ore or ore concentrates, it is not uncommon to add different types of metals as collectors. Different types of metals added as collectors include silver, copper, tin, zinc, lead, gold, platinum, or other metals.

The second step, and a step common to any ore or ore concentrates starting materials includes the formation of ingots from the ores or ore concentrates. This is indicated in block 16 of the method 10 of FIG. 1.

The ingots, which comprise the ore or ore concentrates, plus the added collector metals, may then take either of two paths, depending on various factors. These two paths comprise two of the three paths illustrated in FIG. 1.

The left path in FIG. 1 provides that the ingots from block 16 are remelted in an electron beam furnace. This step is illustrated in block 18. That is, the ingots are sent directly to an electron beam furnace where they are melted. After the remelting process in the electron beam furnace, block 20 indicates that ingots are again formed after the electron beam furnace remelting step. The ingots recovered or formed in block 20 are then used as an anode in a plating solution. The plating step will be discussed in more detail in FIG. 6, below.

In the plating step of block 22, anode mud is collected from the bottom of the plating tank. The anode mud, as indicated above, comprises a material which is not plated onto a cathode in the plating operation. The anode mud is removed from the plating tank and is then separated by well known techniques into the various metals contained in the anode mud. This is indicated in block 24 of FIG. 1.

The second method for the ore or ore concentrates utilizes the ingots from block 16 directly in a plating solution. This is illustrated in block 30 of FIG. 1. The ingots from block 16 are placed directly in a plating tank and the ingots, as indicated above, are utilized as an anode in the plating solution. The metals from the ingots which are not plated onto the cathode fall to the bottom of the tank as anode mud. This is indicated in block 32 of FIG. 1.

The anode mud 32 is collected from the plating tank in block 34 and is pressed into pellets. The pellets 34 are then remelted in the electron beam furnace, as indicated in block 36 of FIG. 1.

The ingots which result from the remelting of the pellets in the electron beam furnace in step 36 are then separated by the standard separation techniques well known and understood in the art. This is indicated in block 38 of FIG. 1. The noble metal separation steps of blocks 24 and 38 are, as indicated above, well known and understood steps. The metals at this stage or these stages can now be recognized because they are broken down or separated from the clusters contained in the original starting materials, which include the ore, the ore concentrates, or anode mud, as indicated in block 12 of FIG. 1.

The anode mud starting material from block 12 comprises the beginning material for the third separation technique, as indicated in block 50 of FIG. 1. The anode mud from the block 50 is pressed into pellets, as indicated in block 52 of FIG. 1. The pellets from block 52 are then remelted in the electron beam furnace, in accordance with block 54 of FIG. 1.

The remelted material from block 54 is then separated by the standard separation techniques discussed above, in accordance with the step of block 56 of FIG. 1. It will be noted that the steps comprising blocks 50, 52, 54, and 56 are substantially identical to, or comparable to, the steps indicated in blocks 32, 34, 36, and 38 of FIG. 1, and which comprise the second method for the ore or ore concentrates starting materials after the starting materials are formed into ingots. A dotted line 40 in FIG. 1 indicates the correlation between methods 2 and 3.

It will be noted that blocks 24, 38, and 56 of FIG. 1 all refer to "noble metals" to be separated. The term "noble metals" is therein and herein used in the broad sense as applying to all metals, including noble metals and rare earths, that are not generally recognized in the clusters from which they are freed by the method and apparatus of the present invention.

FIG. 2 is a view in partial section through an electron beam furnace 70 usable with the processes described above in conjunction with FIG. 1. FIG. 3 is a view in partial section of a portion of the furnace apparatus 70 of FIG. 2, taken generally along line 3—3 of FIG. 2. FIG. 4 is an enlarged view of another portion of the furnace apparatus 70 of FIG. 2 taken generally from oval 4 of FIG. 2. For the following discussion, reference will primarily be directed to FIGS. 2, 3, and 4.

The electron beam furnace 70 includes an outer housing 72 and an inner housing 82. The outer housing 72 and the inner housing 82 are spaced apart from each other. A plurality of cooling coils 90 are disposed against the inner housing 82 in the space between the outer housing 72 and the inner housing 82. Within the inner housing 82 is an interior chamber 86. Two electron beams guns 160 and 170 are used to vaporize or remelt the starting materials in the furnace 70.

The cooling coils 90 comprise a serpentine configuration of water conduits which help to cool the inner housing 82. The cooling coils 90 are connected to a water source 92 by a pair of conduits 94 and 96. Cooling water is pumped through the conduit 94 to the cooling coils 90, and the water is recirculated or pumped out of the coils 90 through the conduit 96.

While "water" and "water source" are discussed and illustrated, it will be understood that any coolant medium may be used. Any appropriate medium, such as a liquified gas, may be used in place of water. The cooler the inside furnace walls of the inner housing 83, which comprise condenser or condensing plates, the greater the efficiency of condensing vaporized metal from the vaporization of the various metals from the remelting process of the electron beam.

For feeding raw material, such as a plurality of ingots 16, pellets 34, or pellets 52 into the interior 86 of the furnace apparatus 70, feed apparatus 100 is appropriately secured to the outer housing 72 and extends through the inner housing 82. The feed apparatus 100 includes a hopper or container 102 which contains a plurality of stacked ingots 16, or pellets 34, or 52.

At the bottom of the hopper or container 102 is a pusher housing 104. The pusher housing 104 includes a channel 106 which includes an opening 108 extending through the walls 72 and 82 and communicating with the interior 86 of the furnace 70. Disposed within the channel 106 is a pusher piston 102, and a rod 112 is connected to the piston 110.

In operation, the piston 110 is retracted by its piston rod 112 to allow the lowermost ingot 16, or a plurality of pellets, to drop down from the hopper 102 into the channel 106. The piston 110 is then moved forwardly, or toward the right as shown in FIG. 2, to cause the ingot, or a plurality of pellets, to move into the interior of the furnace 86. The push rod 110 is coordinated with the ability of an electron beam gun 160 to melt the ingot or pellets to cause the melted ingot or pellets to fall into a receptacle or crucible 120.

In the receptacle or crucible 120, another electron beam gun 170 continues the remelting process for melting the ingot or the pellets to break the bonds or to free the various metals from their clustered condition so that they may be recognized and accordingly recovered by conventional methods.

The receptacle 120 extends downwardly and outwardly from the housings 72 and 82 so that the melted material may be removed from the furnace apparatus as desired. At the lower portion of the receptacle 120 is a door 122. The door 122 is used, of course, for removing the melted or remelted material from the receptacle 120.

In view of the ability to continually add material to the electron beam furnace 70 and to remove the melted or remelted material from the furnace, the furnace apparatus 70 may be considered as a continuous furnace apparatus. The ability to constantly feed and to constantly remove allows the furnace to keep operating without the necessity for terminating the furnace operation in order to remove the melted or remelted material therefrom and to add new material to be melted or remelted into the furnace.

For evacuating the interior of the furnace or furnace chamber 86, a vacuum pump 130 is appropriately connected to the interior 86 through the housings or walls 72 and 82. The vacuum pump 130 is connected to the interior 86 by a conduit 132. From the vacuum pump 130, a conduit 134 extends. The conduit 134 is vented to the atmosphere.

Disposed along the conduit 134 are two recovery units for recovering metals from the interior of the furnace. The recovery units include an osmium recovery unit 140 and a ruthenium recovery unit 142. Osmium and ruthenium molecules are freed during the vaporization or melting process from the ingots or pellets. Thus freed from the clusters to which they are bonded, they are relatively volatile and accordingly are sucked out of the interior 86 by the vacuum pump 130. The recovery of the osmium and ruthenium is accomplished by well known and understood recovery units on the discharge side of the vacuum pump 130.

The electron beam gun 160 is located or positioned adjacent to the opening 108 and is used to melt the lowermost ingot or pellets as it is (they are) pushed into the chamber 86 by the piston 110. As illustrated in FIG. 3, the beam from the electron gun 160 moves generally in a single axis direction. That is, it sweeps back and forth in a wide direction across the front of the opening 108 ingot 116 (or pellets) as the ingot is (or pellets are) pushed from the channel 106 into the interior 86 of the furnace apparatus 70. The material melted from the ingot 108 as it is pushed into the interior of the furnace by the electron beam 160 falls downwardly into the receptacle 120. In the receptacle or crucible 120, the melted ingot, or the pellets, if pellets are used instead of ingots, are subjected to further melting or remelting by the electron beam gun 170.

As schematically illustrated in FIG. 2, the electron beam gun 170 moves in two axes, both an X axis and a Y axis, to substantially cover the entire surface of the material disposed in a receptacle 120. The control or sweep of the electron beams from the guns 160 and 170 is controlled by magnetic deflector yokes in well known and understood manners. The X and Y movement of the electron beam from the electron beam 170 is schematically illustrated in FIG. 2.

A power supply and control unit 180 is connected to the electron beam guns 160 and 170 by appropriate conductors 182 and 184, respectively. The conductors 182 and 184 are in actuality a plurality of conductors, as required for controlling the guns 160 and 170, and their magnetic deflector coils, etc., all as well known and understood in the art.

Figure 5:
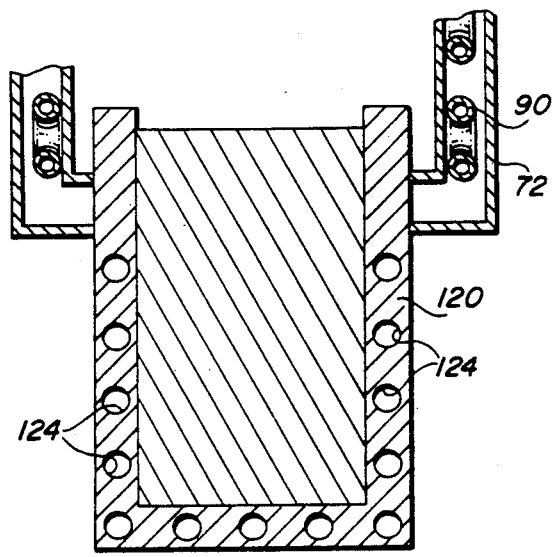
FIG. 5 is a view in partial section of a portion of an alternate embodiment of the apparatus of FIG. 2.

FIG. 5 is a view in partial section of an alternate embodiment of the crucible 120 of FIG. 2. In FIG. 5, in addition to the cooling coils 90, disposed against the wall of the inner housing 82, there are also cooling coils 124 disposed in the walls of the crucible 120. The cooling coils 124 may simply be passages drilled or cast into the crucible 120 which serve as conduits for the cooling medium, such as water, which flows through the coils 90. Since the crucible 120 is fixed in place, the cooling coils 90 may be connected directly to the cooling coils or passages 124 in the receptacle or crucible 120. The crucible or receptacle 120 accordingly does not require a separate cooling system. Rather, the various cooling coils or passages are all connected as part of a single water coolant system for cooling the electron beam furnace apparatus 70.

Figure 6:
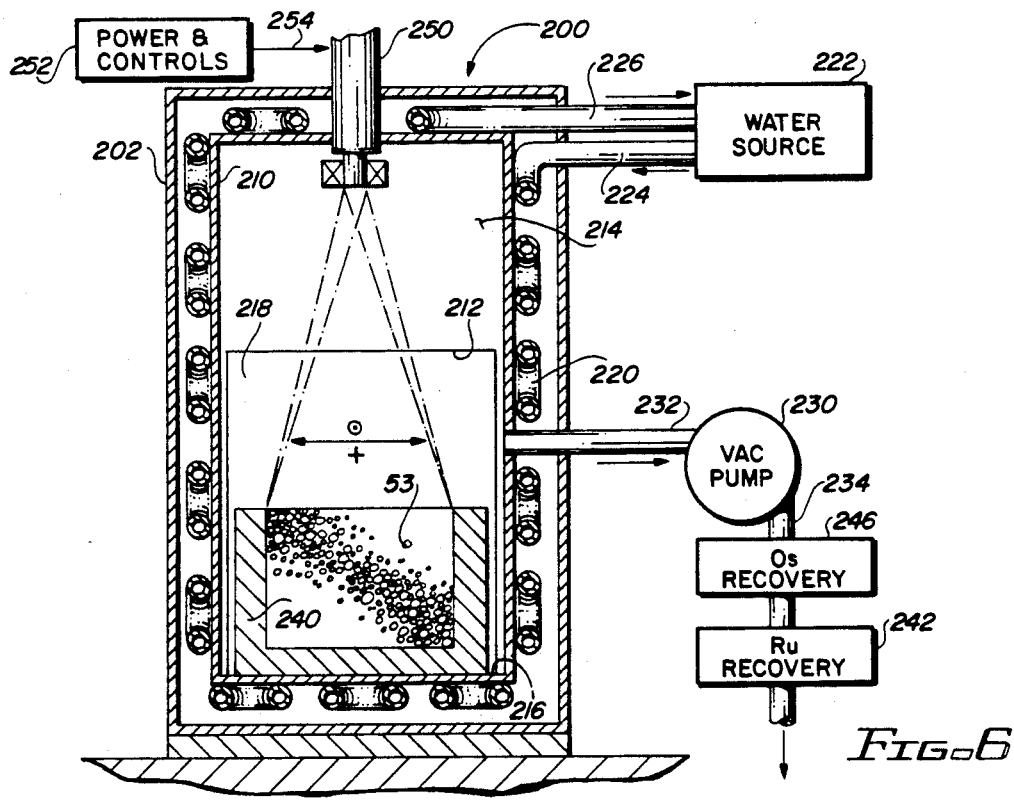
FIG. 6 is a view in partial section of an alternate embodiment of the apparatus of the present invention.

FIG. 6 is a view in partial section of an electron beam furnace 200. The furnace 200 is not a continuous feed furnace, as is the furnace 70. Rather, the furnace 200 is an intermittent type furnace which preferably receives rocks or pellets 53 in a crucible. The crucible with rocks or pellets is inserted into the furnace, and the furnace is then turned on. After the melting of the rocks or pellets, the furnace is turned off and the crucible, with its melted material, is removed.

The furnace 200 includes an outer housing 202 and an inner housing 210. The outer housing 202 and the inner housing 210 are spaced apart from each other. Within the inner housing 210 is an interior chamber 214. The inner housing 210 includes a floor 216, which comprises the floor of the chamber 214. A crucible 240 is disposed on the floor 216 of the chamber 214. The crucible 240 may be made of copper, or the like, and is preferably water cooled. (No cooling coils or the like are shown).

Entry into the chamber 214 is by means of a door 218 which covers an opening 212 which extends through both the outer housing 202 and the inner housing 210.

A plurality of cooling coils 220 are appropriately secured to the outside of the inner housing 210. The cooling coils 220 are substantially identical to the cooling coils 90 of the furnace apparatus 70, as discussed above. The cooling coils 220 are connected to a pump or other water or coolant source 222 by a pair of conduits 224 and 226. The water or coolant source (and pump) 222 provides for the circulation of a coolant medium through the coils 220 for the housing 210, (and for a cooling system for the crucible 240).

A vacuum pump 230 is connected to the interior chamber 214 by a conduit 232. The vacuum pump 230 is also connected to a discharge conduit 234 for venting the vacuum pump 230 to atmosphere. Osmium and ruthenium recovery units are also appropriately connected to the vent conduit 234, as with the vacuum pump 130 and its vent conduit 134.

An electron beam gun 250 is centrally located at the top of the furnace 200. The electron beam gun 250 is connected to appropriate power and control elements by means of a cable cluster 254. The electron beam gun 250 is utilized to melt the rocks and/or pellets 53 disposed in the crucible 240. As is schematically illustrated in FIG. 6, the electron beam from the gun 250 moves in two planes to substantially cover the entire area of the crucible 240 for melting the material 53 in the crucible 240. The control of the electron beam is accomplished in the above referred-to well known and understood method of magnetic control yokes.

Obviously, the intensity of all of the electron beam guns utilized in the apparatus of the present invention are controlled, as desired, by the appropriate power and control elements 180 and 252, as schematically illustrated in FIGS. 2 and 6.

Figure 7:
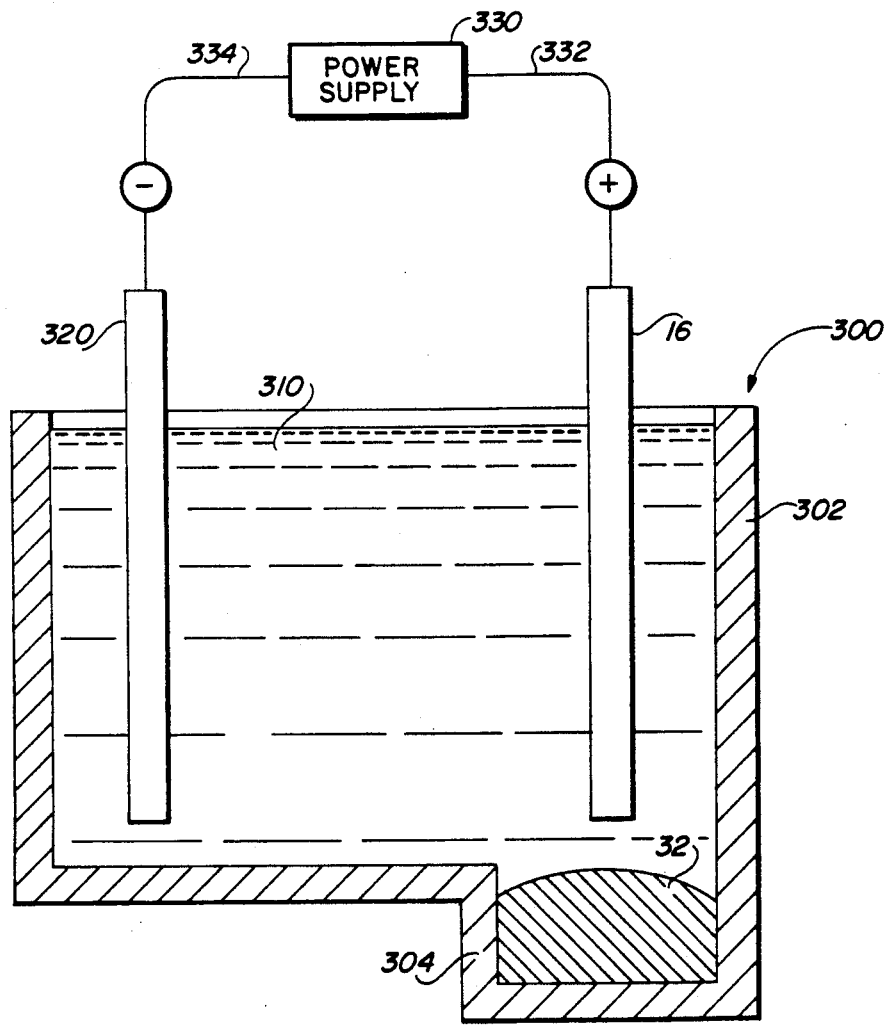
FIG. 7 is a view in partial section of apparatus included in the present invention.

FIG. 7 is a view in partial section of plating apparatus 300 usable with the plating steps discussed above in conjunction with FIG. 1. The plating apparatus 300 includes a container or vat 302. At the bottom of the container or vat 302, and disposed beneath the anode, which is an ingot 16, is a sump 304. The container or vat 302 includes an electrolyte solution 310. In addition to the anode ingot 16, a cathode 320 extends into the electrolyte 310 in the vat 302. The cathode 320 may be a stainless steel plate, a copper plate, nickel plate, or other appropriate metal plate, or the like.

A power supply 330 is connected to the ingot anode 16 and to the cathode 320 by a pair of conductors 332 and 334, respectively.

During the electroplating operation, material from the anode or ingot 16 is transferred to the electrolyte and is plated onto the cathode 320. Material which is not transferred or plated onto the cathode 320 falls into the sump 304. This material, or anode mud 32, is then removed from sump 304 of the vat 302 and is pressed into pellets, as discussed above in conjunction with FIG. 1, and is then melted in an electron beam furnace, such as the furnace 70 of FIG. 1 or the furnace 200 of FIG. 6.

Referring again to FIG. 1, it will be noted that broad terms are used. Since different metals and materials have different melting temperatures and different vaporizing temperatures, it is obvious that some of the materials will be vaporized by the electron beam guns, and not just "melted" as primarily discussed above. For example, the furnaces 70 and 200 each have osmium and ruthenium recovery units in the exhaust portions of the vacuum pump systems. Obviously, those particular metals, and others, may be vaporized by the electron beam guns and will, as discussed, generally be carried out of the furnace structures in their vaporized states or in relatively small condensed particle structures and into and through the vacuum pump structures. Similarly, other metals may also be vaporized and transported out of the furnace structures and will be recovered in the vacuum pump exhaust. Thus, the term "melt" and/or "remelt" as used herein includes "vaporize" in its meaning.

If the sides of the furnaces are cool enough, more metals may condense within the furnace, either on the sides or within the crucibles. Obviously, the greater the condensation of the metals, the easier the ultimate recovery of the metals, and the greater the efficiency of the apparatus and of the metal recovery.

While the principles of the invention have been made clear in illustrative embodiments, there will be immediately obvious to those skilled in the art many modifications of structure, arrangement, proportions, the elements, materials, and components used in the practice of the invention, and otherwise, which are particularly adapted to specific environments and operative requirements without departing from those principles. The appended claims are intended to cover and embrace any and all such modifications, within the limits only of the true spirit and scope of the invention.

What I claim is:

1. Furnace apparatus for recovering metals, comprising, in combination:
    housing means, including an inner housing and an outer housing spaced apart from and disposed about the inner housing and means for cooling the inner housing;
    crucible means disposed within the housing means for holding a quantity of material having unrecognizable metals in clusters to be melted;
    electron beam gun means secured to the housing means for melting and vaporizing the material in the crucible means to free the metals from the clusters to enable the metals to be recognized and recovered by the condensing of the freed metals on the cooled inner housing.

2. The apparatus of claim 1 in which the housing means further includes vacuum means for evacuating the inner housing for the melting and vaporizing of the material by the electron beam gun means and for removing from the inner housing relatively volatile metals vaporized by the electron beam gun means.

3. The apparatus of claim 1 in which the housing means further includes means for substantially continuously feeding material into the inner housing for melting and vaporizing.

4. The apparatus of claim 3 in which the means for substantially continuously feeding material into the inner housing includes hopper means for holding the material, channel means communicating with the hopper means and the inner housing for receiving material from the hopper means and through which the material is moved into the inner housing, and means for moving the material through the channel means and into the inner housing.

5. The apparatus of claim 3 in which the electron beam gun means includes a first electron beam gun for melting the continuously fed material to cause the material to fall into the crucible means, and a second electron beam gun for melting the material in the crucible means.

6. The apparatus of claim 4 in which the crucible means includes a receptacle having a portion extending outwardly from the outer housing and door means on the outwardly extending portion through which the material is removed after melting by the electron beam gun means.

7. The apparatus of claim 2 in which the vacuum means includes means for recovering the relatively volatile vaporized metals removed from the inner housing.

8. Furnace apparatus for recovering metals, comprising, in combination;
    housing means, including an inner housing and an outer housing spaced apart from the inner housing;
    means disposed within the inner housing for holding a quantity of material having unrecognizable metals in clusters to be vaporized;
    electron beam gun means secured to the housing means for vaporizing the material in the means for holding a quantity of material to free the metals from the clusters to enable the metals to be recognized and recovered;
    vacuum means for evacuating the inner housing during the vaporizing of the material and for removing relatively volatile vaporized metals from the inner housing; and
    means for recovering the relatively volatile vaporized metals removed form the inner housing by the vacuum means.

9. The apparatus of claim 8 in which the housing means further includes means for cooling the inner housing for condensing metals freed by the vaporizing of the material.

* * * * *